United States Patent [19]

Noguchi et al.

[11] Patent Number: 4,688,055
[45] Date of Patent: Aug. 18, 1987

[54] LIQUID JET RECORDING HEAD HAVING A LAYER OF A RESIN COMPOSITION CURABLE WITH AN ACTIVE ENERGY RAY

[75] Inventors: Hiromichi Noguchi, Atsugi; Tadayoshi Inamoto, Machida; Megumi Munakata, Atsugi, all of Japan

[73] Assignee: Canon Kabushiki Kaisha, Tokyo, Japan

[21] Appl. No.: 881,620

[22] Filed: Jul. 3, 1986

[30] Foreign Application Priority Data

Jul. 13, 1985 [JP] Japan ................... 60-153351

[51] Int. Cl.$^4$ ............................................ G01D 15/18
[52] U.S. Cl. .................. 346/140 R; 522/95; 522/102; 522/121; 156/668; 430/281
[58] Field of Search ............... 346/140; 522/95, 102, 522/121; 156/668; 430/280, 281

[56] References Cited

U.S. PATENT DOCUMENTS 4,412,224 10/1983 Sugitani ............. 346/140 X
4,509,063 4/1985 Sugitani ............. 346/140
4,521,787 6/1985 Yokota ............. 346/140

Primary Examiner—Joseph W. Hartary
Attorney, Agent, or Firm—Fitzpatrick, Cella, Harper & Scinto

[57] ABSTRACT

A liquid jet recording head has a liquid passage communicated to the discharging outlet of the liquid which is formed with a resin composition cured with an active energy ray. The resin composition to be cured comprises (i) a heat-crosslinkable linear copolymer containing 5-30 mol % of a monomer of formula I and 5-50 mol % of a monomer of formula II

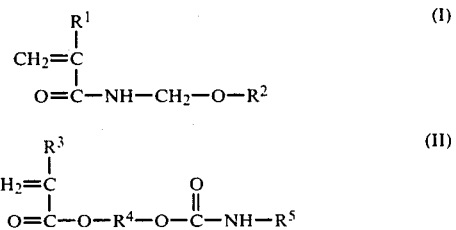

and (ii) a monomer having an ethylenically unsaturated bond.

3 Claims, 10 Drawing Figures

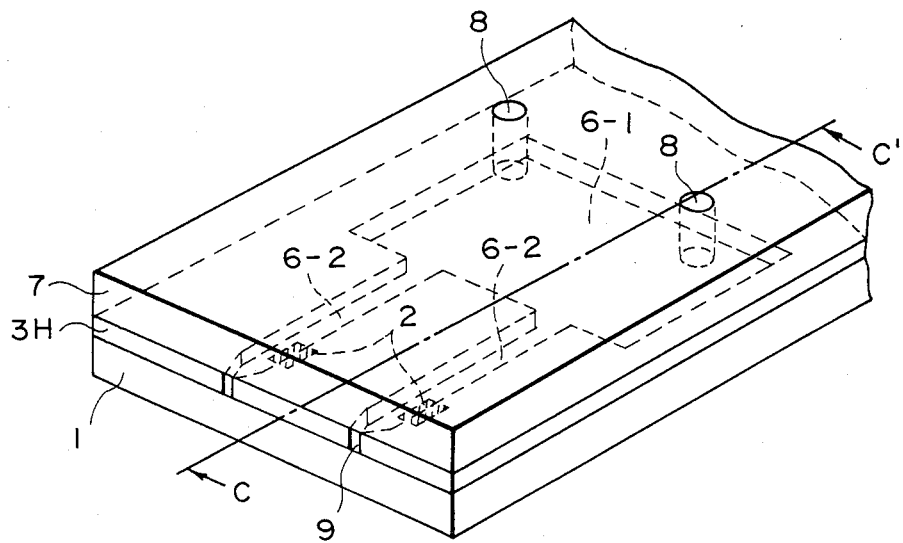
F I G. IA
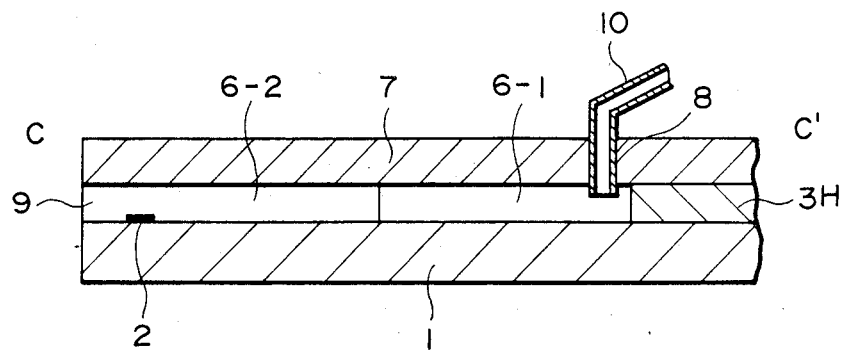
F I G. IB

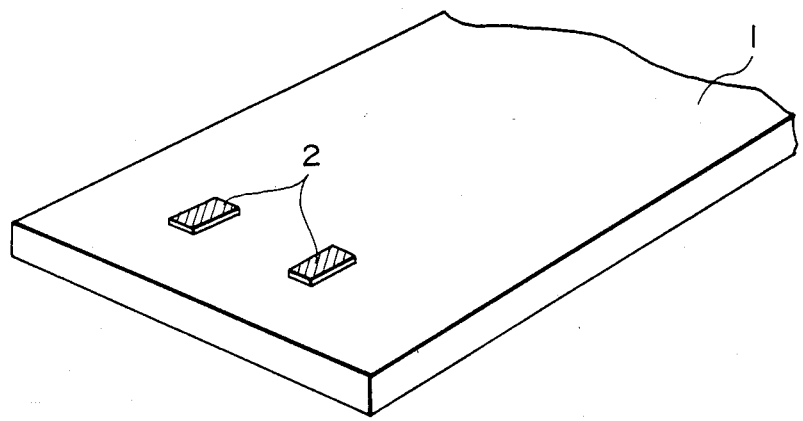
F I G. 2
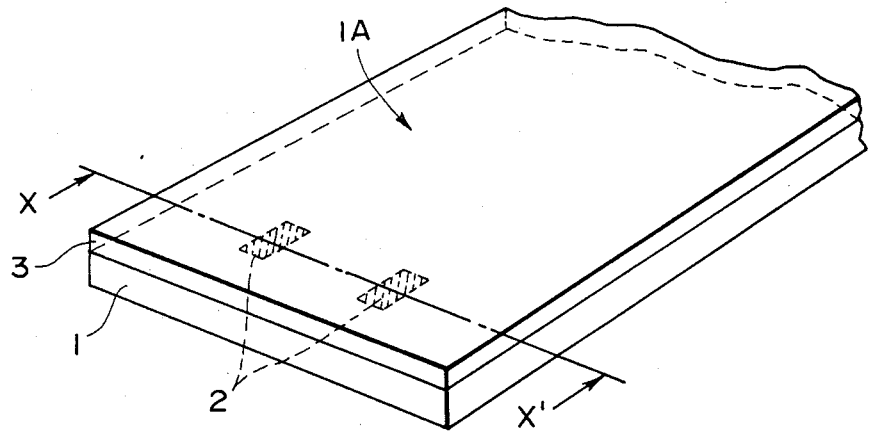
F I G. 3A
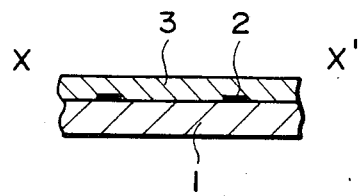
F I G. 3B

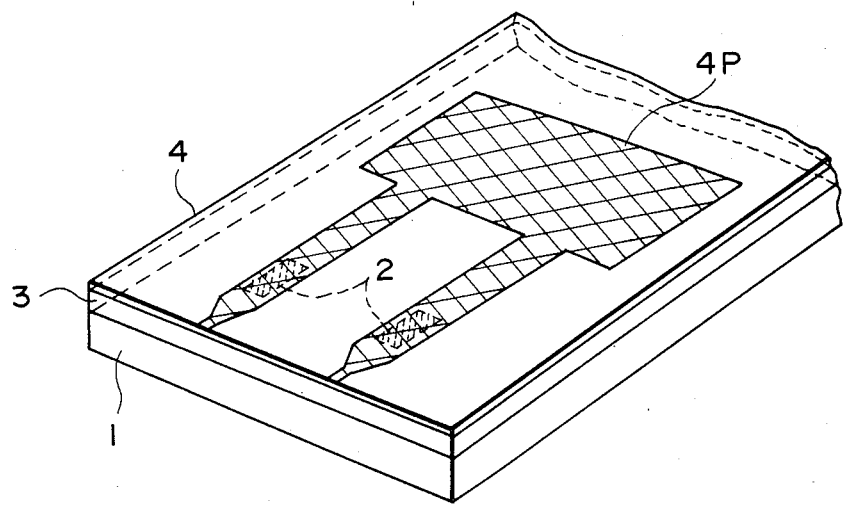
F I G. 4
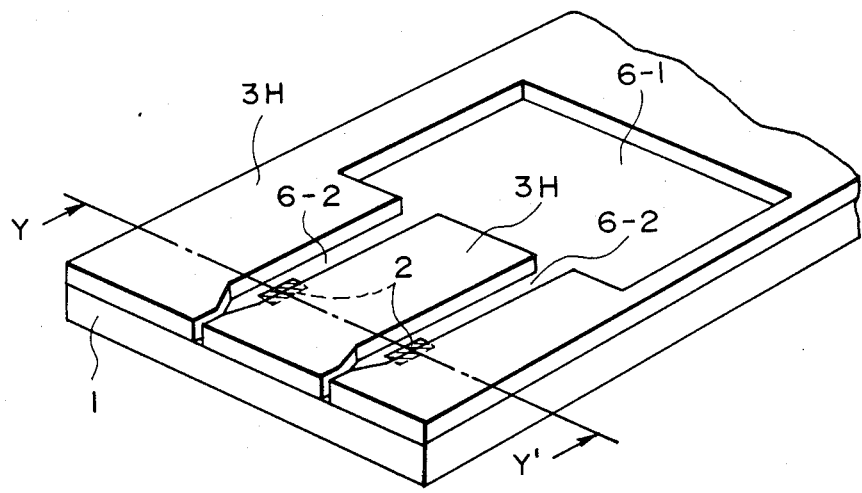
F I G. 5A
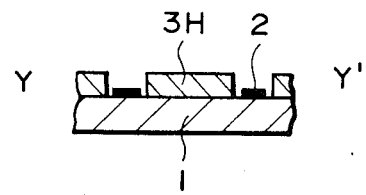
F I G. 5B

LIQUID JET RECORDING HEAD HAVING A LAYER OF A RESIN COMPOSITION CURABLE WITH AN ACTIVE ENERGY RAY

BACKGROUND OF THE INVENTION

1. Field of the Invention

This invention relates to a liquid jet recording head, more particularly to a recording head for generation of small droplets of a liquid for recording to be used in a liquid jet recording system in which recording is performed by generating small droplets of a liquid for recording such as ink, etc., and attaching them onto a recording medium such as paper.

2. Related Background Art

The liquid jet recording system which performs recording by generating small droplets of a liquid for recording such as ink, etc., and attaching them onto a recording medium such as paper is attracting attention as the recording system which generates extremely little to neglegible noise during recording, is capable of high speed recording and enables recording on plain paper without requiring any special treatment such as fixing. Various types of this system have been actively studied.

The recording head portion of the recording device to be used in the liquid jet recording system generally consists of an orifice for discharging a liquid for recording (liquid discharging outlet), a liquid passage connected to the orifice and having a portion at which the energy for discharging the liquid for recording acts on the liquid for recording, and a liquid chamber for storing the liquid for recording to be fed into the liquid passage.

The energy for discharging the liquid for recording during recording is generated in most cases by means of a discharge energy generating element of various types such as heat generating element, piezo-electric element, etc., which is arranged at a predetermined position at the portion where the discharging energy is permitted to act on the liquid for recording which constitutes a part of the liquid passage (energy acting portion).

As a method for preparing the liquid jet recording head with such a constitution, there have been known, for example, a method comprising the steps of forming fine grooves on a flat plate of glass, metal, etc., by cutting or etching and bonding another appropriate plate onto the flat plate having such grooves formed thereon to thereby form liquid passages, or a method comprising the steps of forming groove walls of a cured photosensitive resin on a substrate having a discharging energy generating element arranged thereon according to a photolithographic step to provide grooves for the liquid passages on the substrate and bonding another flat plate (covering) onto the grooved plate thus formed to thereby form liquid passages (for example, Japanese Laid-open Patent Application No. 57-43876).

Of these methods for preparation of the liquid jet recording heads, the latter method employing a photosensitive resin is more advantageous than the former method in that liquid jet recording heads can be provided with better quality and cheaper cost because it enables fine working with better precision and better yield and mass production with ease.

As the photosensitive resin to be used in preparation of such recording heads, there have been employed those used for pattern formation in printing plates or printed-wiring or those known as the photocurable coating materials or adhesives to be used for glass, metal, ceramics, etc. Also, for working efficiency, dry film type resins have been primarily utilized.

In the recording head employing a cured film of a photosensitive resin, in order to obtain excellent characteristics such as high recording characteristic, durability and reliability, etc., the photosensitive resin to be used for the recording head is required to have the following characteristics.

(1) particularly excellent adhesion between the cured film and a substrate;

(2) excellent mechanical strength and durability, etc., when cured; and (3) excellent sensitivity and resolution during patterning by use of pattern exposure light.

However, under the present situation, none of the photosensitive resins used for formation of the liquid jet recording head hitherto known in the art satisfy all of the above requisite characteristics.

To describe in more detail, those employed for pattern formation in printing plates, printed-wirings, etc., as the photosensitive resin for recording head are inferior in adhesion or close contact with glass, ceramics, plastic film, etc., to be used as the substrate, although they are excellent in sensitivity and resolution, and also insufficient in mechanical strength and durability when cured. For this reason, at the stage of preparation of recording heads, or in the course during usage, there is involved the drawback that deformation of the resin cured film or peel-off from the substrate or damages are liable to occur, which may cause marked impairment in the reliability of the recording head such as lowering in recording characteristics by impeding the flow of the liquid for recording in the liquid passages or making the liquid droplet discharging direction unstable.

On the other hand, those which are known as photocurable type coating materials or adhesives to be used for glass, metals, ceramics, etc., although having advantages of excellent close contact or adhesiveness with the substrate formed of these materials and also satisfactory mechanical strength and durability obtained when cured, are inferior in sensitivity and resolution and therefore require an exposure device of higher intensity or an exposure operation of longer time. Further, their inherent characteristics can not afford providing precise and high density pattern with good resolution, whereby there is involved the problem that it is not suitable for a recording head for which minute precise working is particularly required.

SUMMARY OF THE INVENTION

The present invention has been accomplished in view of the problems as described above and an object of the present invention is to provide a liquid jet recording head having a liquid passage wall comprising a resin cured film satisfying all of the requisite characteristics as mentioned above, which is inexpensive, precise, high in reliability and excellent in durability.

Another object of the present invention is to provide a liquid jet recording head having a constitution of which the liquid passage is minutely worked with good precision and good yield.

It is also another object of the present invention to provide a liquid jet recording head which is high in reliability and excellent in durability even when formed into multi-orifices.

According to the present invention, there is provided a liquid jet recording head, having a liquid passage communicated to the discharging outlet of the liquid provided on a substrate surface, said passage being formed by subjecting a layer of a resin composition curable with an active energy ray to a predetermined pattern exposure with the use of said active energy ray to form a cured region of said resin composition and removing the uncured region from said layer.

Said resin composition comprising (i) a heat-crosslinkable linear copolymer containing 5 to 30 mol % of a monomer represented by the formula I shown below and 5 to 50 mol % of a monomer represented by the formula II shown below, as the copolymer constituents:

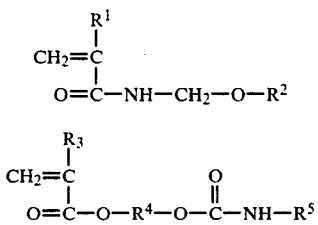

(wherein $R^1$ represents hydrogen or alkyl or hydroxyalkyl group having 1 to 3 carbon atoms; $R^2$ hydrogen or alkyl or acyl group having 1 to 4 carbon atoms which may have a hydroxy group; $R^3$ hydrogen or alkyl group having 1 to 3 carbon atoms; $R^4$ divalent hydrocarbon group which may have internally an ether bond and may also be substituted with halogen atoms; and $R^5$ alkyl having 3 to 12 carbon atoms or phenylalkyl group or phenyl group), and (ii) a monomer having an ethylenically unsaturated bond.

BRIEF DESCRIPTION OF THE DRAWINGS

FIGS. 1A to FIGS. 6B are schematic illustrations for explanation of the liquid jet recording head of the present invention and the methods for producing the same.

DESCRIPTION OF THE PREFERRED EMBODIMENTS

Figure 6A:
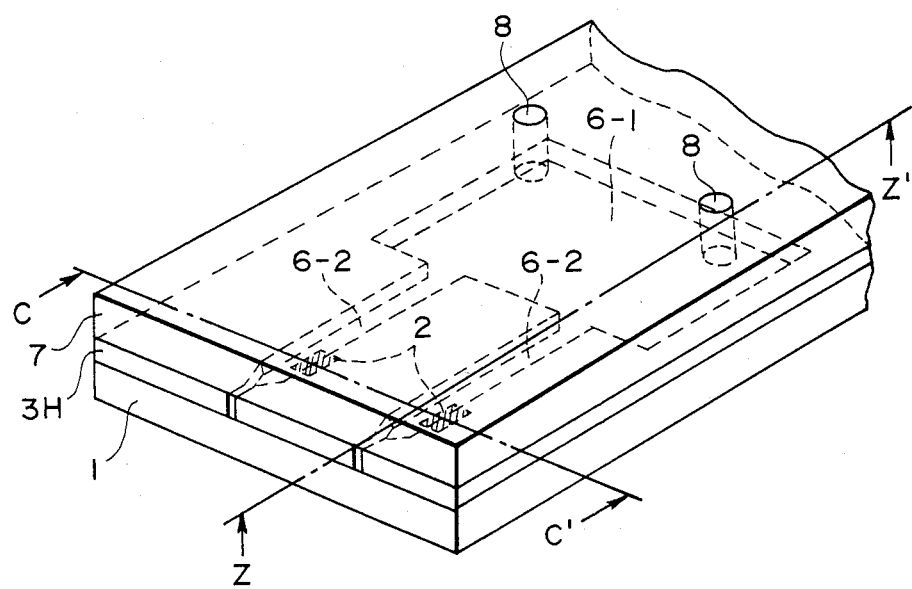

Referring now to the drawings, the liquid jet recording head of the present invention is described in detail.

FIG. 1 is an embodiment of the liquid recording head of the present invention, FIG. 1A showing a perspective view of the main portion thereof and FIG. 1B showing a sectional view of FIG. 1A cut along the line C—C'.

The liquid jet recording head comprises basically a substrate 1, a resin cured film 3H provided on the substrate 1 and subjected to patterning to a desired shape and a covering 7 laminated on the resin cured film 3H, and these members form an orifice 9 for discharging a liquid for recording, liquid passages 6-2 communicated to the orifices 9 and having the portions at which the energy for discharging the liquid for recording acts on the liquid for recording, and a liquid chamber 6-1 for storing the liquid for a recording to be supplied to the liquid passages 6-2. Further, at the thru-hole 8 provided on the covering 7, a feeding pipe 10 for feeding the liquid for recording from outside of the recording head into the liquid chamber 6-1 is bonded. In FIG. 1A, the feeding pipe 10 is omitted.

During recording, the energy for discharging the liquid for recording is generated by applying discharging signals as desired to the discharge energy generating elements 2 of various types such as heat-generating elements, piezoelectric elements, etc., arranged at predetermined positions in the portions for imparting the discharging energy on the liquid for recording constituting a part of the liquid passages 6-2 through wirings (not shown) connected to these elements 2.

The substrate 1 constituting the recording head of the present invention comprises glass, ceramic, plastic or metal and the energy generating elements 2 are arranged in a desired number at predetermined positions. In the embodiment of FIG. 1, two energy generating elements are provided, but the number and arrangement of the heat generating elements are determined depending on the desired constitution of the recording head.

On the other hand, the covering 7 comprises a flat plate of glass, ceramic, plastic or metal and is bonded onto the resin cured film 3H by fusion or adhesion by use of an adhesive, and it is also provided with a thruhole 8 for connecting a feeding pipe 10 at a predetermined position.

In the recording head of the present invention, the resin cured film 3H subjected to patterning to the predetermined shape constituting the walls of the liquid passages 6-2 and the liquid chamber 6-1 is obtained by subjecting a layer comprising a resin composition with the composition as described below on the substrate 1 or on the covering 7 to patterning according to a photolithographic step. The resin cured film 3H may also be subjected to patterning as integrated with covering 7 formed with the resin composition.

The resin composition to be used for formation of a resin cured film provided on a substrate for constituting such a portion which becomes at least the liquid passage is an active energy ray-curing resin composition comprising: (i) a heat-crosslinkable linear copolymer containing 5 to 30 mol % of a monomer represented by the formula I shown below and 5 to 50 mol % of a monomer represented by the formula II shown below, as the copolymer constituents:

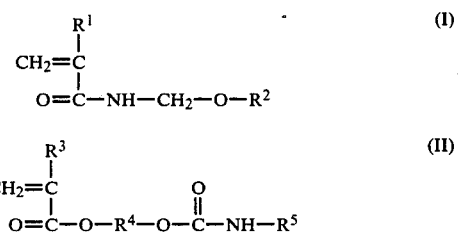

(wherein $R^1$ represents hydrogen or alkyl or hydroxyalkyl group having 1 to 3 carbon atoms; $R^2$ hydrogen or alkyl or acyl group having 1 to 4 carbon atoms which may have a hydroxy group; $R^3$ hydrogen or alkyl group having 1 to 3 carbon atoms; $R^4$ divalent hydrocarbon group which may have internally an ether bond and may also be substituted with halogen atoms; and $R^5$ alkyl having 3 to 12 carbon atoms or phenylalkyl group or phenyl group), and (ii) a monomer having an ethylenically unsaturated bond. The resin composition has good adhesion to a substrate comprising glass, plastic, ceramic, etc., particularly when formed into a cured film, and is also excellent in resistance to the liquid for recording, e.g. ink, and is excellent in mechanical strength. Further it has an excellent characteristic as the constituent member of a liquid jet recording head that a precise and high resolution pattern can be formed by patterning with an active energy ray. Further, the resin composition can be used as a dry film, and also in that case, the above excellent characteristics can be exhibited.

The composition of the active energy curing type resin composition to be used for formation of the recording head of the present invention will be described in detail below.

The heat-crosslinkable linear copolymer (i) which is an essential component of the active energy ray-curing resin composition has 5 to 30 mol % of a monomer of the above formula I having hydrophilic property and heat-crosslinkability and 5 to 50 mol % of a monomer of the above formula II for imparting sufficient adhesiveness and mechanical strength to the pattern obtained by curing of the composition as the components for copolymerization, respectively. Excellent adhesiveness to a substrate can be exhibited due to the above hydrophilic property, and also excellent properties of structural materials such as heat resistance, chemical resistance, mechanical strength, etc. can be exhibited by heat crosslinkability. The monomers represented by the above formulae I and II should preferably be contained in the heat crosslinkable linear copolymer at a proportion of about 50 mol % or less as their total amount.

Specific examples of the monomer represented by the formula I to be used in construction of the above heat crosslinkable linear copolymer may include acrylamide derivatives such as N-methylol(meth)acrylamide (hereinafter the expression (meth)acrylamide means includes both acrylamide and methacrylamide) N-propoxymethyl(meth)acrylamide, N-n-butoxymethyl(meth)acrylamide, β-hydroxyethoxymethyl(meth)acrylamide, N-ethoxymethyl(meth)acrylamide, N-methoxymethyl(meth)acrylamide, N-acetoxymethyl(meth)acrylamide, α-hydroxymethyl-N-methylolacrylamide, α-hydroxyethyl-N-butoxymethylacrylamide, α-hydroxypropyl-N-propoxymethylacrylamide, α-ethyl-N-methylol acrylamide, α-propyl-N-methylolacrylamide and the like.

These monomers represented by the formula I are required to be contained at a proportion of 5 to 30 mol % in the heat crosslinkable linear copolymer. With a content less than 5 mol %, sufficient chemical resistance can not be imparted to the pattern obtained by curing of the resin composition for formation of the recording head of the present invention. On the other hand, if the content exceeds 30 mol %, there will ensue the problem such that the pattern obtained by curing becomes brittle.

On the other hand, the monomer represented by the formula II is required to be contained at a proportion of 5 to 50 mol % in the heat crosslinkable linear copolymer. With a content less than 5 mol %, sufficient adhesiveness and mechanical strength can not be imparted to the pattern obtained by curing of the said resin composition of the present invention. On the contrary, if the content exceeds 50 mol %, the composition obtained will be markedly lowered in softening point, whereby there will ensue the problems such as lowering in surface hardness or deterioration in chemical resistance by swelling of the pattern obtained by curing of the composition.

$R^4$ in the monomer represented by the formula II used for formation of the heat crosslinkable copolymer can be any divalent hydrocarbon group which may have internally an ether bond and also may be substituted with halogen atoms. Preferable examples of $R^4$ include alkylene group having 2 to 12 carbon atoms which may be substituted with halogen atoms, alicyclic hydrocarbon group such as 1,4-bismethylenecyclohexane, and hydrocarbon groups containing an aromatic ring such as bisphenyldimethylmethane.

Specific examples of the monomer represented by the formula II include (α-alkyl)acrylic acid esters having one or more urethane bond in one molecule comprising reaction products obtained by the reaction of (α-alkyl)acrylic acid esters having one hydroxyl group in one molecule with monoisocyanate compounds. Examples of (meth)acrylic acid esters having at least one hydroxyl group in one molecule to be used in preparation of the monomer represented by the above formula II include 2-hydroxyethyl(meth)acrylate, 2-hydroxypropyl (meth)acrylate, 3-chloro-2-hydroxypropyl (meth)acrylate, 4-hydroxybutyl (meth)acrylate, 3-hydroxybutyl (meth)acrylate, 5-hydroxypentyl (meth)acrylate, 6-hydroxyhexyl (meth)acrylate or Light Ester HO-mpp (produced by Kyoeisha Yushi Kagaku Kogyo K.K.). As the (α-alkyl)acrylic acid ester having one hydroxyl group in one molecule, other than above, (a) esters of aliphatic or aromatic divalent alcohols with (meth)acrylic acids and (b) (meth)acrylic acid esters of monoepoxy compounds can be similarly used.

Examples of the divalent alcohol to be used in the above (a) may include 1,4-cyclohexanedimethanol, 1,10-decanediol, neopentylglycol, bis(2-hydroxyethyl)-terephthalate, addition reaction products of 2 to 10 mols of ethyleneoxide or propyleneoxide added to bis phenol A. On the other hand, the monoepoxy compounds to be used in the above (b) may include Eporite M-1230 (trade name, produced by Kyoeisha Yushi Kagaku Kogyo, K.K.), phenylglycidyl ether, cresylglycidyl ether, butylglycidyl ether, octylene oxide, n-butylphenol glycidyl ether, etc.

As the monoisocyanate compound to be used in preparation of the monomer represented by the formula II, there may be included alkyl monoisocyanates comprising one isocyanate group added to alkyl groups $ having 3 to 12 carbon atoms and phenyl isocyanate, cresyl monoisocyanate and the like.

These monomers represented by the formula II can prepared easily by carrying out the reaction between an acrylic acid ester having one hydroxyl group in one molecule and a monoisocyanate compound in the presence of a catalyst such as dibutyl tin dilaurate.

The monomer represented by the formula I to be used for preparing the heat-crosslinkable linear copolymer has hydrophilic property and imparts firm adhesiveness to the composition of the present invention when the resin composition used in the present invention adheres to a substrate such as glass, ceramics, plastic, etc. The monomer represented by the above formula I also has condensing crosslinkability by heating and will generally form crosslinks through elimination of water molecules or alcohol at a temperature of 100 ° C. or higher to thereby form a network structure in the heat crosslinkable copolymer itself after curing, whereby excellent chemical resistance and mechanical strength can be imparted to the pattern obtained by curing.

As the heat-crosslinkable linear copolymer, in addition to the monomers represented by the above formulae I and II, various monomers generally used for the preparation of acrylic resins, vinyl resins, etc., can be used as the components for copolymerization in amounts within the range of from 20 to 90 mol %. These monomers can be used for various purposes such as imparting high agglomeration strength to the resin composition for formation of a resin cured film in the present invention, etc.

The resin composition used for formation of the recording head of the present invention can be provided in various forms such as a solution or a solid film, etc. If it is to be used as a dry film, in order to maintain the composition in the form of a film, it is preferable to use a heat-crosslinkable linear copolymer obtained by copolymerization of a monomer giving relatively rigid properties having a glass transition temperature of about 50° C. or higher in addition to the monomers of the formulae I and II. Examples of the monomer other than those of the formulae I and II to be used in preparation of a heat-crosslinkable linear copolymer suitable for such a purpose may include alkyl methacrylates having 1 to 4 carbon atoms in the alkyl group such as methyl methacrylate, ethyl methacrylate, isobutyl methacrylate, t-butyl methacrylate and the like, acrylonitrile, isobornyl methacrylate, isobornyl acrylate, styrene, etc., of which homopolymers have a glass transition temperature of about 50° C. or higher. Of course, these monomers can be used by selecting suitably at least one of them. Further, in addition to these monomers, other known monomers having hydroxy group, amino group, carboxyl group or glycidyl group or monomers of which polymers have a glass transition temperature lower than about 50° C. may be suitably selected and used.

The above hydroxyl containing monomer may be exemplified by 2-hydroxyethyl (meth)acrylate, 3-chloro-2-hydroxy (meth)acrylate and the like, and the amino containing monomer such as N,N-dimethylaminoethyl (meth)acrylate, (meth)acrylamide, N,N-dimethylaminoethyl(meth)acrylamide, N,N-dimethyl(meth)acrylamide, N,N-dimethylaminopropyl(meth)acrylamide, N,N-di-tbutylaminoethyl(meth) acrylamide and the like. Examples of the carboxyl containing monomer may include (meth)acrylic acid, fumaric acid, itaconic acid or those known under the trade names Aronix M-5400, Aronix M5500, etc., which are products of Toa Gosei Kagaku K.K., and the monomer having glycidyl group may include glycidyl (meth)acrylate, etc.

On the other hand, when the resin composition for formation of a resin cured film in the present invention is to be used in a solution form, it is also possible to employ heat-crosslinkable linear copolymer having a low glass transition temperature which can give flexibility to the composition. However, also in this case, in order to obtain a pattern having excellent chemical resistance and high mechanical strength, it is preferable to use a heat-crosslinkable linear copolymer having a high glass transition temperature.

Anyway, the heat-crosslinkable linear copolymer to be used for the resin composition for formation of a resin cured film in the present invention enables precise patterning by imparting form retentivity to the composition in the curing step of the composition (namely formation of a pattern by irradiation of active energy ray and subsequent heat curing), and also gives excellent adhesiveness, chemical resistance and high mechanical strength to the pattern obtained by curing.

The monomer (ii) having an ethylenically unsaturated bond to be used as another component in the resin composition for formation of a resin cured film in the present invention is a component for permitting the said composition to exhibit curability with an active energy ray, preferably having a boiling point of 100° C. or higher under atmospheric pressure, preferably also having two or more ethylenically unsaturated bonds, and various known monomers curable by irradiation of an active energy ray can be used.

Specific examples of such monomers having two or more ethylenically unsaturated bonds include (a) acrylic acid esters or methacrylic acid esters of polyfunctional epoxy resins having two or more epoxy groups in one molecule, (b) acrylic acid esters or methacrylic acid esters of alkyleneoxide addition products of polyhydric alcohols, (c) polyester acrylates having acrylic acid ester group at the terminal ends of the molecular chains of polyesters having molecular weights of 500 to 3000 comprising dibasic acid and dihydric alcohol, (d) the reaction products between polyisocyanates and acrylic acid monomers having hydroxyl groups. The above monomers (a)–(d) may be urethane modified products having urethane bonds in the molecules.

Examples of the monomers belonging to (a) include acrylic acid or methacrylic acid esters of epoxy resins as represented by the bisphenol A type, novolac type, alicyclic type, or polyfunctional epoxy resins such as bisphenol S, bisphenol F, tetrahydroxyphenylmethane tetraglycidyl ether, resorcinol diglycidyl ether, glycerine triglycidyl ether, pentaerythritol triglycidyl ether, isocyanuric acid triglycidyl ether and epoxyurethane resins represented by the following formula III:

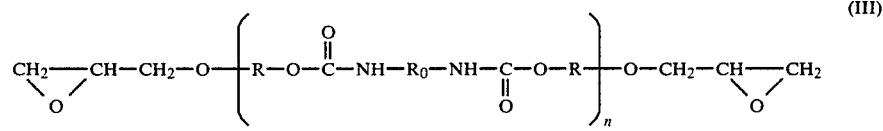

(wherein R represents an alkylene group or an oxyalkylene group, R$_0$ represents

or an alkylene group).

Examples of the monomers belonging to include ethyleneglycol di(meth)acrylate, diethyleneglycol di(meth) acrylate, polyethyleneglycol di(meth)acrylate, 1,6-hexanediol di(meth)acrylate, polyethyleneglycol di(meth)acrylate, pentaerythritol tri(meth)acrylate and the like, and those known under the trade names of KAYARAD HX-220, HX-620, D-310, D-320, D-330, DPHA, R-604, DPCA-20, DPCA-30, DPCA-60, DPCA-120 (all produced by Nippon Kayaku K.K.), and also those known under the trade names of NK ester BPE-200, BPE-500, BPE-1300, A-BPE-4 (all produced by Shin Nakamura Kagaku K.K.), etc., may also be used.

The monomers belonging to may be exemplified by those known under the trade names of Aronix M-6100, M-6200, M-6250, M-6300, M-6400, M-7100, M-8030, M-8060, M-8100 (all produced by Toa Gosei Kagaku K.K.). Examples of the monomers belonging to and having urethane bonds of polyester include those known under the trade names of Aronix M-1100, Aronix M-1200, (both produced by Toa Gosei Kagaku K.K.).

The monomers belonging to (c) may include the reaction products between polyisocyanate such as tolylene diisocyanate, isophorone diisocyanate, hexamethylene diisocyanate, trimethylhexamethylene diisocyanate, lysine diisocyanate, diphenylmethane diisocyanate or the like and a hydroxyl containing acrylic monomer, and it is possible to use the reaction products having (meth)acrylic acid esters containing hydroxyl group(s) added to polyisocyanate compounds known under the trade names of Sumidule N (buret derivative of hexamethylene diisocyanate), Sumidule L (trimethylolpropane modified product of tolylene diisocyanate) (all produced by Sumitomo Bayer Urethane K.K.), etc. The hydroxyl containing acrylic monomer as herein mentioned may include typically (meth)acrylic acid esters, preferably, hydroxyethyl (meth)acrylate, hydroxypropyl (meth)acrylate. It is also possible to use other acrylic monomers containing hydroxyl group(s) previously mentioned for preparation of the monomer represented by the formula I in the heat-crosslinkable linear copolymer.

In addition to the monomers having two or more ethylenically unsaturated bonds as mentioned above, it is also possible to use monomers having only one ethylenically unsaturated bond as mentioned below together with those monomers. To exemplify such monomers having one ethylenically unsaturated bond, there may be included, for example, carboxyl containing unsaturated monomers such as acrylic acid, methacrylic acid or the like; glycidyl containing unsaturated monomers such as glycidyl acrylate, glycidyl methacrylate or the like; $C_2$-$C_8$ hydroxyalkyl esters of acrylic acid or methacrylic acid such as hydroxyethyl acrylate, hydroxyethyl methacrylate, hydroxypropyl acrylate, hydroxypropyl methacrylate or the like; monoesters of acrylic acid or methacrylic acid with polyethyleneglycol or polypropyleneglycol such as polyethyleneglycol monoacrylate, polyethyleneglycol monomethacrylate, polypropyleneglycol monoacryllate, polypropyleneglycol monomethacrylate or the like; $C_1$-$C_{12}$ alkyl or cycloalkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate, cyclohexyl methacrylate or the like; other monomers such as styrene, vinyltoluene, methylstyrene, vinyl acetate, vinyl chloride, vinyl isobutyl ether, acrylonitrile, acrylamide, methacrylamide, acrylic acid or methacrylic acid adduct of alkylglycidyl ether, vinylpyrrolidone, dicyclopentenyloxyethyl(meth)acrylate, ε-caploractone-modified hydroxyalkyl(meth)acrylate, tetrahydrofurfulyl acrylate, phenoxyethyl acrylate; and others.

Anyway, by use of the above monomer having ethylenically unsaturated bonds, curability to an active energy ray can be imparted to the resin composition for formation of a resin cured film in the present invention.

The active energy ray-curing resin composition for formation of a resin cured film in the present invention should preferably contain a photopolymerization initiator added therein when employing an active energy ray with wavelength of 250 nm to 450 nm. As the photopolymerization initiator, known substances to be used in photopolymerization can be used without any particular limitation.

Specific examples of such photopolymerization initiators include benzyl; benzoin alkyl ethers such as benzoin isobutyl ether, benzoin isopropyl ether, benzoin-n-butyl ether, benzoin ethyl ether, benzoin methyl ether and the like; benzophenones such as benzophenone, 4,4'-bis(N,N-diethylamino)benzophenone, benzophenone methyl ether and the like; anthraquinones such as 2-ethylanthraquinone, 2-t-butylanthraquinone and the like; xanthones such as 2,4-dimethylthioxanthone, 2,4-diisopropylthioxanthone and the like; acetophenones such as 2,2-dimethoxy-2-phenylacetophenone, α,α-dichloro-4-phenoxyacetophenone, p-tert-butyltrichloroacetophenone, p-tert-butyldichloroacetophenone, 2,2-diethoxyacetophenone, p-dimethylaminoacetophenone and the like; or hydroxycyclohexylphenyl ketone (e.g. Irugacure 184, produced by Ciba Geigy Co.), 1-(4-isopropylphenyl)-2-hydroxy-2-methylpropane-1-one (e.g. Darocure 1116, produced by MERCK Co.), 2-hydroxy-2-methyl-1-phenyl-propane-1-one (Darocure 1173, produced by MERCK Co.); etc., as preferable ones. In addition to these photopolymerization initiators, amino compounds may be added as the photopolymerization accelerator.

The amino compounds to be used as the photopolymerization accelerator may include ethanolamine, ethyl-4-dimethylaminobenzoate, 2-(dimethylamino)ethylbenzoate, p-dimethylamino benzoic acid n-amylester, p-dimethylaminobenzoic acid isoamylester, etc.

The constitutional ratio of the above materials constituting the active energy ray-curing resin composition for formation of a resin cured film in the present invention may be made 20 to 80 wt. %, preferably 20 to 50 wt. % for the heat crosslinkable linear copolymer and 80 to 20 wt. %, preferably 50 to 80 wt. % for the monomer having ethylenically unsaturated bonds.

When a photopolymerization initiator is used in the resin composition of the present invention, the photopolymerization initiator may be used in an amount within the range from 0.1 to 20 parts by weight, preferably from 1 to 10 parts by weight based on 100 parts by weight of the resin components comprising the heat-crosslinkable linear copolymer and the monomer having ethylenically unsaturated bonds.

As the solvent to be used when employing the active energy ray-curing resin composition for formation of a resin cured film in the present invention in the form of a solution or when coating the composition on a plastic film which is a film substrate in formation of a dry film, hydrophilic solvents such as alcohols, glycol ethers, glycol esters, etc., may be employed. Of course, it is also possible to use mixtures comprising these hydrophilic solvents as the main component, mixed optionally at appropriate proportions with ketones such as methyl ethyl ketone, methyl isobutyl ketone, etc., esters such as ethyl acetate, isobutyl acetate, etc., aromatic hydrocarbons such as toluene, xylene, etc., and their halogen derivatives, aliphatic solvents containing chlorine such as methylene chloride, 1,1,1-trichloroethane, etc. These solvents can also be used as the developer for the resin composition after pattern exposure.

The active energy ray-curing resin composition for formation of a resin cured film in the present invention may further contain in addition to the above photopolymerization initiator or the solvent as described above, additives such as catalysts for condensation crosslinking, heat polymerization inhibitors, colorants (dyes and pigments), fine particulate fillers, adhesion promotors, plasticizers, etc., if desired.

The condensation crosslinking catalyst may include sulfonic acids, typically p-toluenesulfonic acid, carboxylic acids such as formic acid, etc. The heat polymerization inhibitor may include hydroquinone and derivatives thereof, p-methoxyphenol, phenothiazine, etc. As the colorant there can be added oil-soluble dyes and pigments within the range which do not substantially prevent transmission of the active energy ray. As the filter, for enhancement of hardness of coating, as well as for enhancement of coloration, adhesion, mechanical strength, there may be employed extender pigments, plastic fine particles, etc., which are used in coating materials in general. As the adhesion promotor, silane coupling agents, low molecular weight surfactants as inorganic surface modifiers may be effectively used in the composition of the present invention.

The resin composition comprising the composition as described above is cured with an active energy ray to form the resin cured film 3H possessed by the recording head of the present invention. Next, as an embodiment of the case when employing a dry film type as the resin composition for formation of the resin cured film 3H, the method for preparing the liquid jet recording head of the present invention is described in detail by referring to the drawings.

FIGS. 2 to 6 are schematic illustrations for description of the preparation procedure of the liquid jet recording head of the present invention.

For formation of the liquid jet recording head of the present invention, first, as shown in FIG. 2, a discharge energy generating element 2 such as heat generating element or piezoelectric element is arranged in a desired number on a substrate 1 such as glass, ceramic, plastic or a metal. If desired, for the purpose of imparting resistance to the liquid for recording or electrical insulating property, etc., to the surface of the substrate 1, the surface may be coated with a protective layer of $SiO_2$, $Ta_2O_5$, glass, etc. Also, to the discharge energy generating element 2 is connected electrodes for inputting recording signals, although not shown in the drawing.

Next, the surface of the substrate 1 obtained after the step shown in FIG. 2 is cleaned and at the same time dried at, for example, 80° to 150° C., and then the active energy ray-curing resin composition 3 as described above of the dry film type (film thickness, about 25 μm to 100 μm), as shown in FIG. 3A and FIG. 3B is heated to about 40° to 150° C. and laminated on the substrate surface 1A at a speed of, for example, 0.5 to 0.4 f/min. under the pressurizing condition of 1 to 3 Kg/cm².

Subsequently, as shown in FIG. 4, on the dry film layer 3 provided on the substrate surface 1A, a photomask 4 having a pattern 4P with a desired shape which does not transmit the active energy ray is superposed, and then exposure is effected from above the photomask 4.

Registration between the photomask 4 and the substrate 1 is effected so that the above element 2 may be positioned in the liquid passage region finally formed after the steps of exposure and developing processing, etc., for example, according to the method in which registration marks are previously drawn respectively on the substrate 1 and the mask 4 and registration is effected following the marks.

By carrying out such an exposure, the portion other than that covered with the pattern, namely the portion exposed of the dry film layer 3 is cured by polymerization, to become insoluble in a solvent, while the unexposed portion remains soluble in a solvent.

The active energy ray to be used for such a pattern exposure may include ultraviolet rays (UV-rays) or electron beams which have widely been practically applied. As the UV-ray light source, there may be employed high pressure mercury lamps, ultra-high pressure mercury lamps, metal halide lamps, etc., enriched in light with wavelength of 250 nm to 450 nm, preferably those which can give a light intensity of about 1 $mW/cm^2$ to 100 $mW/cm^2$ at the wavelength in the vicinity of 365 nm at a distance between the lamp and the material to be irradiated which is practically permissible. The electron beam irradiation device is not particularly limited, but a device having a dose within the range of 0.5 to 20 M Rad is practically suitable.

After completion of the pattern exposure of the dry film layer 3, the dry film 3 subjected to exposure is developed by, for example, dipping in a volatile organic solvent such as 1,1,1-trichloroethane, etc., to remove by dissolution the unpolymerized (uncured) portion of the dry film layer 3 which is solvent soluble, thereby forming the grooves which will finally become the liquid passages 6-2 and liquid chamber 6-1 with the resin cured film 3H remaining on the substrate 1 as shown in FIG. 5A and FIG. 5B.

As the next step, the cured resin film 3H on the substrate 1 is subjected to heat polymerization by heating, for example, at 100° C. for further about 5–10 min.

In the recording head of this embodiment, the grooves for liquid passages 6-2 and liquid chamber 6-1 are formed by referring to an example using a resin composition of the dry film type, namely a solid composition. However, the active energy ray-curing resin composition which can be used in formation of the recording head of the present invention is not limited to only solid compositions, but also a liquid composition may be available.

As the method for forming a layer comprising the composition by use of a liquid resin composition on the substrate, there may be employed, for example, the method according to squeegee as used in preparation of a relief image, namely the method in which a wall with a height corresponding to the desired thickness of the resin composition layer to be formed is provided around the substrate and superfluous resin composition is removed by means of a squeegee, etc. In this case, the resin composition may appropriately have a viscosity of 100 cp to 3000 cp. The height of the wall placed around the substrate is also required to be determined in view of the amount reduced by evaporation of the solvent contained in the light-sensitive resin composition.

When a solid resin composition is employed, it is suitable to use the method in which a dry film is plastered on the substrate by pressure contact under heating.

However, in forming the recording head of the present invention, a solid film type is convenient in handling and also with respect to easy and correct control of the thickness.

Figure 6B:
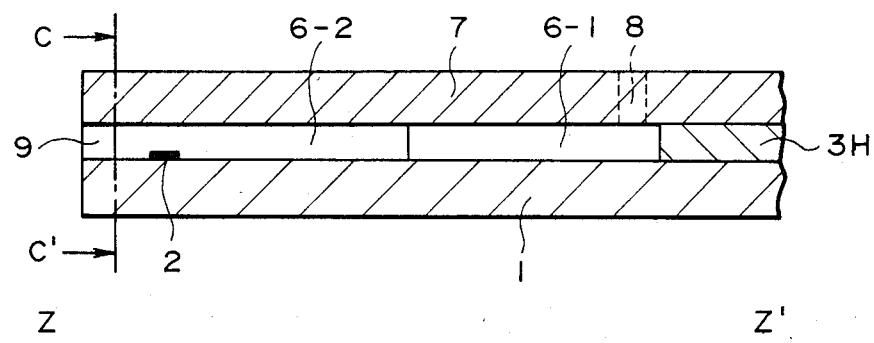

After having thus formed the grooves for constituting finally the liquid passages 6-2 and the liquid chamber 6-1 with the resin cured film 3H, a flat plate 7 which is a covering over the grooves is bonded with an adhesive on the resin cured film 3H to form a bonded body, as shown in FIG. 6A and FIG. 6B.

In the steps shown in FIG. 6A and FIG. 6B, as the specific method for providing the covering 7, for example, after the flat plate 7 of glass, ceramic, metal, plastic, etc., is applied with an epoxy resin type adhesive by spin coating to a thickness of 3 to 4 μm, the adhesive layer is previously heated to effect the so called B-staging and then plastered on the cured dry film 3H, followed by main curing of the above adhesive layer. However, it is also possible to use no adhesive such as by having a flat plate 7 of a thermoplastic resin such as acrylic resin, ABS resin, polyethylene, etc., thermally fused directly onto the resin cured film 3H.

It is also preferable to use the method in which a resin layer comprising the resin composition for formation of the resin cured film in the present invention is provided on the covering 7 on the side to be bonded to the liquid passages, the resin layer is thermally fused to the resin cured film 3H having formed liquid passages thereon and thereafter heated with irradiation of an active energy ray, namely the method of using the resin composition for formation of the resin cured film in the present invention as the adhesive.

In FIG. 6, 6-1 shows a liquid chamber, 6-2 liquid passages and 8 the thru-holes for connecting feeding pipes (not shown) for feeding the liquid for recording to the liquid chamber 6-1 from outside of the recording head not shown.

After having completed thus the bonding between the resin cured film 3H provided on the substrate 1 and the flat plate 7, the bonded body is cut along C—C' positioned on the downstream side of the liquid passage 6-2 shown in FIG. 6A and FIG. 6B, thereby forming an orifice for discharging the liquid for recording which is the opening portion of the liquid passage at the cut surface.

This step is conducted for making the interval between the discharge energy generating element 2 and the orifice 9 adequate, and the region to be cut may be selected suitably. For this cutting, there may be employed the dicing method, etc., which is conventionally employed in semiconductor industries.

The downstream portion of the liquid passage as mentioned in the present invention refers to the region on the downstream side in the flow direction of the liquid for recording when recording is performed by use of a recording head, more specifically the portion of the liquid passage downstream of the position where the discharge energy generating element 2 is located.

After completion of cutting, the cut surface is smoothened by polishing and a feeding pipe 10 is mounted on the thru-hole 8 to complete a liquid jet recording head as shown in FIG. 1.

In the recording head as described above, the liquid passages 6-2 and the liquid chamber 6-1 are formed integrally with a resin cured film 3H, but the recording head of the present invention is not limited to such a structure, and it is also possible to use a structure in which liquid passages are formed separately from the liquid chamber. However, even if any structure may be taken, the recording head of the present invention is such that at least a part of the resin for forming the liquid passage is formed by use of the active energy ray-curing resin composition as described above.

The liquid jet recording head of the present invention uses, as the active energy ray-curing resin composition which is the constitutional member of said head, a composition having very excellent sensitivity to the active energy ray and resolution as the pattern forming material which are imparted primarily by the monomer having ethylenically unsaturated bonds contained as the essential component in said composition, and it has been rendered possible to obtain a liquid jet recording head excellent in dimensional precision with good yield by use of said resin composition.

Also, the resin composition to be used in the present invention has excellent adhesion to a substrate, mechanical strength and chemical resistance imparted primarily by the heat-crosslinkable linear polymer as the essential component, whereby it has been also rendered possible to obtain a recording head having durability for a long term by use of said composition.

Further, the recording head of the present invention comprises a substrate and a resin cured film layer for forming grooves which become at least liquid passages and is excellent in durability of the respective members constituting the recording head as well as adhesiveness between the respective members, with the resin cured film being also minutely worked with good precision, thus having excellent recording characteristics, high reliability and also excellent durability during usage.

The present invention is described in more detail by referring to the following Synthetic examples and Examples.

Synthetic example

By solution polymerization of methyl methacrylate, N-methylol acrylamide and Nissocure UM-1M*[1] in methylcellosolve (methyl methacrylate/N-methylol acrylamide/ Nissocure UM-1M=50/25/25 moler ratio), a linear polymer having heat crosslinkability with a weight average molecular weight of $5.7 \times 10^4$ was obtained (this is called P-1).

*[1]: Product name of Shin Nisso Kako K.K., which is a monomer having the structure shown below:

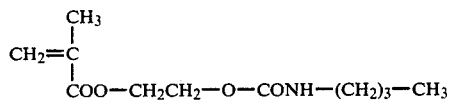

By use of the linear polymer P-1, an active energy ray curing type resin composition was prepared as follows.

| | |
|---|---|
| P-1 | 100 parts by weight |
| Light Ester 3002M*[2] | 90 parts by weight |
| Pentaerythritol triacrylate | 60 parts by weight |
| Benzophenone | 9 parts by weight |
| Micheler's ketone | 3 parts by weight |
| Paratoluene sulfonic acid | 2.5 parts by weight |
| Crystal Violet | 0.5 parts by weight |
| Methyl cellosolve | 250 parts by weight |

*[2]Methacrylic acid ester of epoxy resin produced by Kyoeisha Yushi Kagaku Kogyo K.K.

Next, the above resin composition was applied to a polyethylene terephthalate film with a thickness of 16 μm by a wire bar, followed by drying at 100° C. for 20 minutes, to prepare a dry film according to the present invention having a resin composition layer with a film thickness of 75 μm.

EXAMPLE

By use of the dry film prepared in the Synthetic example, following the steps of FIG. 1 to FIG. 6 as described previously in the specification, an on-demand type liquid jet recording head having an orifice having 10 orifices (orifice dimension: 75 μm×50 μm, pitch 0.125 mm) with heat generating elements [hafnium boride (HfB$_2$)] as the discharge energy generating element was prepared as follows. Thirth recording heads were was prepared in the same shape.

First, a plurality of heat generating elements were arranged at the predetermined positions on the substrate comprising silicon and electrodes for applying recording signals were connected to these.

Next, a SiO$_2$ layer (thickness 1.0 μm) as the protective film was provided on the substrate surface having the heat generating elements arranged thereon, and the surface of the protective layer was cleaned and dried. Then, the dry film with a thickness of 75 μm as shown in the above Synthetic example heated to 80° C. was laminated on the protective layer at a speed of 0.4 f/min. under the pressurizing condition of 1 Kg/cm$^2$.

Subsequently, on the dry film provided on the substrate surface, a photomask having a pattern corresponding to the shapes of liquid passages and liquid chamber was superposed and, after performing registration so that the above element may be provided in the liquid passages finally formed, the dry film was exposed to UV-ray with an intensity of 12 mW/cm$^2$ from above the photomask for 30 seconds.

Next, the dry film exposed was developed by dipping in 1,1,1-trichloroethane to remove by dissolution the unpolymerized (uncured) portion of the dry film from the substrate, thereby forming grooves which will become finally the liquid passages and liquid chamber with the cured dry film remaining on the substrate.

After completion of development, the cured dry film on the substrate was heated at 150 ° C. for one hour, followed further by irradiation of UV-ray with an intensity of 50 mW/cm$^2$ for 2 minutes to further cure the film.

After having formed thus the grooves for the liquid passages and liquid chamber with the cured dry film, a flat plate comprising soda glass provided with a thruhole which becomes the covering over the groove formed was coated with an epoxy type resin adhesive in the thickness of 3 μm by spin coating, then preheated to effect B-staging and plastered on the cured dry film, followed further by main curing of the adhesive to effect adhesion fixing, thus forming a bonded body.

Subsequently, on the downstream side of the liquid passage of the bonded body, namely at the position of 0.150 mm toward the downstream side from the position where the discharge energy generating element is located, the bonded body was cut vertically relative to the liquid passage by means of a commercially available dicing saw (trade name: DAD 2H/6 model, produced by DISCO Co.) to form orifices for discharging the liquid for recording.

Finally, the cut surfaces were washed and dried, further smoothened by polishing of the cut surfaces, and feeding pipes for feeding the liquid for recording were fitted to the thru-holes to complete the liquid jet recording head. Every one of the recording heads obtained was found to be excellent in dimensional precision having liquid passages and liquid chambers which have faithfully reproduced the mask pattern. The orifice dimension was 50±5 μm and a orifice pitch 125±5 μm.

The recording heads thus prepared were tested for quality and durability during prolonged use, as shown below.

First, for the recording heads obtained, durability test was conducted by dipping in the liquids for recording having the following respective compositions at 60° C. for 1000 hours (the environmental conditions comparable to prolonged use of a recording head).

| Liquid components for recording | |
|---|---|
| (1) H$_2$O/ethyleneglycol/polyethyleneglycol #200/C.I. Direct Black 154*[1] (= 60/30/5/5 weight parts) | pH = 8.0 |
| (2) H$_2$O/ethyleneglycol/C.I. Direct Black 154 (= 55/40/5 weight parts) | pH = 9.0 |
| (3) H$_2$O/diethyleneglycol/N—methyl-2-pyrrolidone/ C.I. Direct Black 154 (= 55/30/10/5 weight parts) | pH = 7.0 |
| (4) H$_2$O/diethyleneglycol/1,3-dimethyl-2-imidazolidinone/C.I. Direct Blue 86*[2] (= 57/30/10/3 weight parts) | pH = 10.0 |

(Note)
*[1] to *[2] are water-soluble dyes, and caustic soda was employed for adjustment of pH.

For each liquid for recording, five recording heads were provided respectively for the durability test.

After the durability test, each head subjected to said test was observed about the bonded state between substrate and the covering and the dry film. As the result, no peel-off or damage could be recognized in all of the recording heads, but good adhesiveness was exhibited.

Next, separately for the 10 recording heads obtained, each head was mounted on a recording device, and the printing test was practiced by use of the above liquid for recording by applying recording signals of 10$^8$ pulse continuously to the recording head for 14 hours. For each recording head, immediately after initiation of printing and after elapse of 14 hours, substantially no lowering in performance in both of the discharging performance of the liquid for recording and printed state can be recognized. Thus, the recording head was found to be excellent in durability.

COMPARATIVE EXAMPLE

Recording heads were prepared in the same manner as in the Example except for using a commercially available dry film Vacrel with a thickness of 75 μm (trade name of dry film solder mask, produced by Du Pont de Nemours Co.) and a commercially available dry film Photec SR-3000 with a film thickness of 50 μm (trade name, produced by Hitachi Kasei Kogyo K.K.).

For these recording heads, the same durability test as in the Example was practiced.

In the course of durability test, when employing Vacrel as the dry film, peel-off was recognized after 100 hours with the liquids for recording (2) and (4). Also, after 300 hours, peel-off was recognized with the liquids for recording (1) and (3).

On the other hand, when employing Photec SR-3000 as the dry film, peel-off was recognized after 300 hours with a respective liquids for recording of (1) to (4).

We claim:

1. A liquid jet recording head, having a liquid passage communicated to the discharging outlet of the liquid provided on a substrate surface, said passage being formed by subjecting a layer of a resin composition curable with an active energy ray to a predetermined pattern exposure with the use of said active energy ray to form a cured region of said resin composition and removing the uncured region from said layer, said resin composition comprising (i) a heat-crosslinkable linear copolymer containing 5 to 30 mol % of a monomer represented by the formula I shown below and 5 to 50 mol % of a monomer represented by the formula II shown below, as the copolymer constituents:

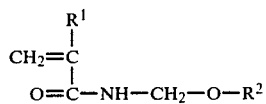
(I)

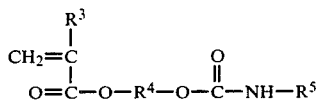
(II)

(wherein $R^1$ represents hydrogen or alkyl or hydroxyalkyl group having 1 to 3 carbon atoms; $R^2$ hydrogen or alkyl or acyl group having 1 to 4 carbon atoms which may have a hydroxy group; $R^3$ hydrogen or alkyl group having 1 to 3 carbon atoms; $R^4$ divalent hydrocarbon group which may have internally an ether bond and may also be substituted with halogen atoms; and $R^5$ alkyl having 3 to 12 carbon atoms or phenylalkyl group or phenyl group), and (ii) a monomer having an ethylenically unsaturated bond.

2. A liquid jet recording head according to claim 1, wherein said resin composition contains 20 to 80 parts by weight of the heat crosslinkable linear copolymer (i) and 80 to 20 parts by weight of the monomer having an ethylenically unsaturated bond (ii).

3. A liquid jet recording head according to claim 1, wherein said resin composition contains 0.1 to 20 wt. % of a photopolymerization initiator based on 100 parts by weight of the total amount of the heat cross-linkable linear copolymer (i) and the monomer having an ethylenically unsaturated bond (ii).

* * * * *

UNITED STATES PATENT AND TRADEMARK OFFICE
CERTIFICATE OF CORRECTION

PATENT NO. : 4,688,055                                    Page 1 of 3

DATED : August 18, 1987

INVENTOR(S) : HIROMICHI NOGUCHI, ET AL.

It is certified that error appears in the above-identified patent and that said Letters Patent is hereby corrected as shown below:

COLUMN 3

Line 36, "FIGS. 1A to FIGS. 6B" should read --FIG. 1A to FIG. 6B--.

Line 44, "liquid recording" should read --liquid jet recording--.

COLUMN 5

Line 28, "includes" should read --to include--.

COLUMN 6

Line 5, "bond" should read --bonds--.
Line 27, "bis phenol" should read --bisphenol--.
Line 37, delete "$".
Line 41, "prepared" should read --be prepared--.

COLUMN 7

Line 40, "tbutylaminoethyl(meth)" should read --t-butylaminoethyl(meth)--.

COLUMN 8

Line 51, "to include" should read --to (b) include--.
Line 64, "to may" should read --to (c) may--.
Line 68, "to and" should read --to (c) and--.

UNITED STATES PATENT AND TRADEMARK OFFICE
CERTIFICATE OF CORRECTION

PATENT NO. : 4,688,055   Page 2 of 3
DATED : August 18, 1987
INVENTOR(S) : HIROMICHI NOGUCHI, ET AL.

It is certified that error appears in the above-identified patent and that said Letters Patent is hereby corrected as shown below:

COLUMN 9

Line 5, "(c)" should read --(d)--.
    Line 43, "monoacryllate," should read --monoacrylate,--.
    Line 58, "caploractone-modified" should read --caprolactone modified--.

COLUMN 11

Line 13, "filter," should read --filler,--.
    Line 44, "is" should read --are--.

COLUMN 12

Line 32, delete "further".

COLUMN 14

Line 35, "moler" should read --molar--.

COLUMN 15

Line 10, "Thirth" should read --Thirty--.
    Line 11, delete "was".

UNITED STATES PATENT AND TRADEMARK OFFICE
CERTIFICATE OF CORRECTION

PATENT NO. : 4,688,055            Page 3 of 3

DATED : August 18, 1987

INVENTOR(S) : HIROMICHI NOGUCHI, ET AL.

It is certified that error appears in the above-identified patent and that said Letters Patent is hereby corrected as shown below:

COLUMN 16

Line 2, "a" should read --the--.
    Line 23, "to" should read --and--.
    Line 62, "a" should read --the--.

Signed and Sealed this

Tenth Day of May, 1988

Attest:

DONALD J. QUIGG

Attesting Officer      Commissioner of Patents and Trademarks